Figure 1:
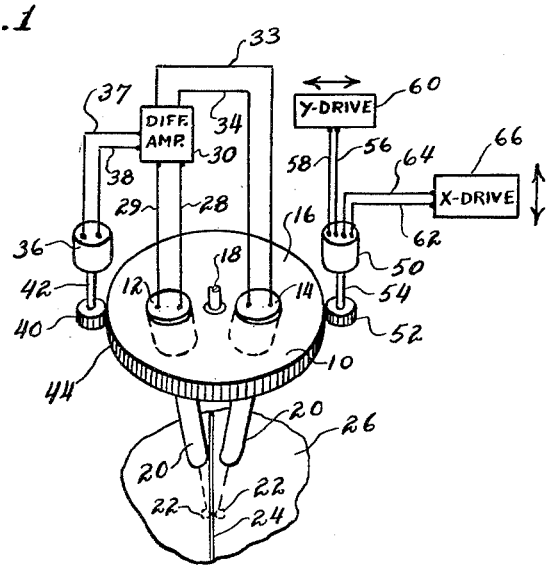

Dec. 18, 1962    E. NEANDER    3,069,550
PHOTOELECTRIC TRACER APPARATUS EMPLOYING
SIDE BY SIDE PHOTOELECTRIC CELLS
Filed June 30, 1959

INVENTOR.
ERICH NEANDER
BY
ATTORNEYS

United States Patent Office 3,069,550
Patented Dec. 18, 1962

3,069,550
PHOTOELECTRIC TRACER APPARATUS EMPLOYING SIDE BY SIDE PHOTOELECTRIC CELLS
Erich Neander, Weisskirchen, Taunus, Germany, assignor to American Messer Corporation, New York, N.Y., a corporation of New York
Filed June 30, 1959, Ser. No. 824,126
2 Claims. (Cl. 250—202)

This invention relates to a photoelectric sensor, and more particularly, to an improved method and means for the photoelectric tracing along a path imprinted upon a drawing.

Sensors, such as photoelectric cells, have been used to trace a path on a scale drawing and to control a working tool in response to the tracing movement. By such means, scale drawings can be employed for tool movement control, eliminating the difficulty of making full scale drawings or templets.

The photoelectric cell is positioned above the scale drawing in scanning relationship thereto and generates a signal the amplitude of which varies with variation in incident illumination. The scale drawing has the desired path imprinted thereon to contrast with the drawing background. The drawing may be illuminated and the difference in light reflected from the drawing and the path used for signal development. Alternately, light may be projected through the drawing, and the difference in light passing through the drawing and the path used for signal development. Apparatus for such light projection is set forth in application, Serial No. 824,124, filed June 30, 1959, for Photoelectric Tracer Apparatus Employing Interrupted Light.

To utilize the generated signal for direction control of movement, the signal must have directional characteristics.

To provide the directional characteristic, it is usual to center the axis of the sensor photocell so that the field of view is bisected by the edge of the line on the drawing representing the path to be transversed by the sensor. In such arrangement deviation of the axis from the drawing edge will give a directional signal output from the photocell increasing if the deviation is such that the axis of the photocell moves towards the drawing background and decreasing if the axis moves on to the drawing path. It will be apparent that the path width must be wider than the field of view encompassed by the photocell at the drawing surface. The width of the drawing line necessary for specific applications will depend upon response speed of the direction control mechanism. However, tracking along the edge of a drawing path has inherent difficulties in certain applications.

For example, if the scale drawing was constructed with the measurements accurate to the inner edge of the drawing line, tracking of the outer edge of the line by the sensor would result in an error of sensor tracking equal to the line thickness. This error would be magnified in the movement of the working tool by the scale ratio to which the drawing is made.

Further, the working tool itself, such as a flame cutting torch may produce a kerf which must be accounted for in making the scale drawing. For example, if a circular cut is to be produced by a sensor following the inside edge of the circular path on the scale drawing the radius to the inside edge must be constructed with a radius of R plus ½S where S is the width of the kerf produced by the control tool. Similarly, if the outer edge of a circular path is being followed, the radius to the outside edge must be R minus ½S. Since the drawing is made to a scale ratio, fabrication of the drawing taking into account all of such factors becomes time consuming and undesirably expensive. Further, the drawing becomes obsolete if the factors, such as the scale ratio, changes.

It is, therefore, one object of this invention to provide a photoelectric sensor which will follow the mid-position of a path imprinted upon a scale drawing for control of a synchronously moved working tool.

It is a further object of this invention to provide an improved method for the control of a driven tool in response to sensor movement over a scale drawing, the width of the line thereon being related to the scale ratio between the sensor movement over the drawing and the movement of the working tool.

Other objects and advantages of this invention will be pointed out hereinafter.

In accordance with these objects there is provided, in a preferred embodiment of this invention, a sensor comprising two photoelectric cells positioned astraddle an axis about which the cells may be rotated. The sensor is positioned above a scale drawing on which the desired path is imprinted with the photoelectric cells in scanning relationship to the drawing. The sensor is positioned so that the field of view of the photoelectric cells are astraddle the desired path on the drawing. Signals from the photocells are applied to a differential amplifier. The differential amplifier will generate an output signal, the amplitude of which varies with the difference between the two applied signals and the polarity of which reverses as the signals reverse relative amplitudes. The output of the differential amplifier is applied to a reversible motor to rotate the photocells into the null or equal signal position. Thus, the photocells will be rotated so that the axis is above the center line of the path on the scale drawing with the fields of view thereof straddling the scale drawing line. Rotation of the photocells is reflected in the generation of a resolver signal which is employed to change the direction of movement of the sensor mechanism in accordance with said signals.

In employing this invention a scale drawing is fabricated wherein the width of the paths thereon are related to the width of the kerf of the controlled tool such as a cutting torch.

Figure 2:
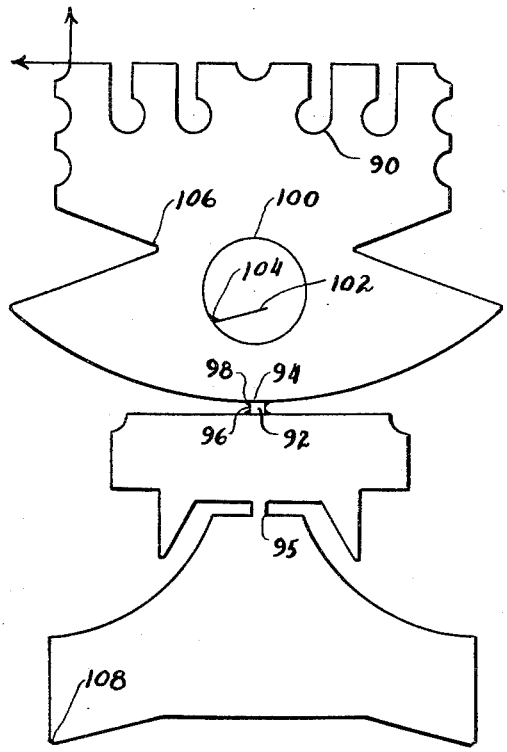

A preferred embodiment of this invention is shown in the accompanying drawing of which:

FIGURE 1 is a perspective view of the photoelectric tracer apparatus in accordance with this invention; and FIGURE 2 is a plan view of a scale drawing suitable for use in the practice method of reproduction.

In FIGURE 1 there is shown a photoelectric sensor 10 comprising two photoelectric cells 12 and 14 mounted in a plate 16. The photocells are positioned in the plate astraddle the axis 18 thereof for rotation bounded by said axis.

The photocells comprise the usual light responsive element and associated optical system contained within the downwardly projecting tube 20. The optical systems are so dimensioned that the photocells will have a field of view 22 at the drawing plane astraddle the path 24 on the drawing 26. A separate light source (not shown) may direct illumination upon the drawing surface, the reflection of which will vary with the position of the scanning photoelectric cells. Alternately, the photocells may be of annular form containing an axially positioned light source. Also, the light may be directed through the drawing to impinge upon the photocells. An example of such apparatus is described in application, Serial No. 824,124, filed June 30, 1959 for Photoelectric Tracer Apparatus Employing Interrupted Light.

In each arrangement the illumination incident upon the photoelectric cells will vary as the field of view encompasses varying proportions of the imprinted path on the drawing. Correspondingly, the signal output from each photocell will vary. The output from photocell 12 is applied over leads 28, 29 to a differential amplifier 30. Output from photocell 14 is applied over leads 33, 34 to the amplifier 30.

The differential amplifier will generate an output signal the amplitude of which varies with the difference between the applied photoelectric cell signals and the polarity of which reverses with change in the signal having the higher amplitude.

The amplifier output signal is applied to reversible motor 36 over leads 37 and 38. The motor is coupled to the plate 16 through the coaction of the pinion 40 on the shaft 42 and the annular gear 44 on the plate. By suitably coupling the amplifier to the motor, the amplifier output signal will be of the proper polarity to rotate the photoelectric cells to the null or equal signal position. Thus as the path 24 on the drawing 26 deviates from the direction of travel of the sensor, one photoelectric cell will scan a greater portion of the path and the signal from said cell will decrease. The difference in signal will generate an output from the differential amplitude to rotate the plate to balance the photocell output signals.

Plate rotation is reflected in rotation of the rotor of resolver 50 through coaction of pinion 52 on the rotor shaft 54 with the annular gear 44 or the plate. Rotation of the resolver will vary the signal applied over leads 56 and 58 to the Y drive mechanism 60 and leads 62 and 64 to the X drive mechanism 66. The signals applied to the co-ordinate axis drive will change the direction of movement of the sensor to align the axis 18 thereof with the center of the desired path 46. Sensor movement can be reflected in tool movement by a servo coupling therebetween. The resolver signals may also control tool movement directly with sensor movement synchronously related through a servo coupling. An example of such an arrangement is set forth in application, Serial No. 824,110 filed June 30, 1959, for Sine-Co-sine Driven Flame Cutting Apparatus.

A typical scale drawing used for control of the cutting apparatus is shown in FIGURE 2. The drawing is shown to comprise an outline path 90 which will be followed by the sensor mechanism resulting in a trace of the same path by the working tool, such as a flame cutting torch to produce the finished part. It is desired that the drawing be made on directional stable stock and that a dark ink such as India ink be used for the outline path. In preparing the drawing, it is desirable that the width of the drawing path be related to the cutting kerf. For example, it has been found that, in cutting plate of a ½ to 1-in. thickness by a flame cutting torch, a kerf of 0.125-in. width is produced by the torch. Since the differential sensor mechanism is a center line tracer, the resultant offset of the sensor centerline from the inside edge of the scale drawing is ½ of the line thickness. By relating the width of the line on the drawing to the kerf width in the same ratio as the scale ratio of the drawing and finish part, kerf allowances and resultant drawing alterations are eliminated. Therefore, if the relative scale between the drawing and the finished product is 1:10, it is desirable that the line on the drawing have a thickness of 0.012 inch to account for the kerf width on the drawing.

It will be noted that often several parts are to be produced with a continuous cut. In such cases bridging webs 92 between adjacent parts should be provided to ensure rigidity of the work piece until the cuts are completed. If the part drawing has been completed (by line 94) the bridging web line 96 should have darkened corners 98 to ensure that the differential sensor mechanism follows the bridge line and does not cross the bridge line to complete the part by cutting along line 94.

If the part outline is interrupted, the bridge lines do not require dark corners (see line 95). When cutting a circle as indicated by line 100, the circle should be started by an internal starting line 102 intersecting the circle at an obtuse angle with a heavy corner 104 drawn thereon. For sharp corner bends such as an angle smaller than 70° the corner should be broken off as shown by line 106. Between 70° and 90° the corner is broken by a short line 107. For angles larger than 90° no special provision need be made. Starting and finishing lines can intersect at 90° since the differential photocell will trace over such intersections.

It will be understood that the invention may be variously embodied and modified within the scope of the subjoined claims.

What is claimed is:

1. A sensor comprising a first and second photoelectric cell, said first and second cell being positioned at ends of a diameter centered around an axis of rotation, and means connected thereto responsive to a difference in amplitude of the differential output signal from the respective cells for rotating said cells to a null position of signals of equal strength, motive means carrying said sensor along a first axis, means coupled to said motive means for moving said sensor along a second axis perpendicular to said first axis, and means responsive to said rotation of said photoelectric cells for changing the relative speeds of said first and second axis moving means.

2. A control apparatus comprising a first and second photoelectric cell rotatably mounted at ends of an axis between said first and second photoelectric cells, said axis having a central point of rotation, said photoelectric cells being positioned so that the fields of view thereof follow edges of a line of a drawing scanned by said cells, means for rotating the photoelectric cells about said point of rotation in accordance with the instantaneous difference between the relative outputs thereof, and a function generator responsive to rotation of the photoelectric cell for controlling the direction of movement of said photoelectric cells.

References Cited in the file of this patent

UNITED STATES PATENTS

| | | |
|---|---|---|
| 2,419,641 | Hart | Apr. 29, 1947 |
| 2,445,041 | Scholz | July 13, 1948 |
| 2,829,274 | Shreck | Apr. 1, 1958 |
| 2,851,643 | Limberger | Sept. 9, 1958 |
| 2,988,682 | Wilhelm | June 13, 1961 |

FOREIGN PATENTS

| | | |
|---|---|---|
| 805,039 | Great Britain | Nov. 26, 1958 |